(12) United States Patent
Krische et al.

(10) Patent No.: US 11,930,793 B2
(45) Date of Patent: Mar. 19, 2024

(54) EXTRUDER SCREW HANDLING DEVICE

(71) Applicant: Bühler AG, Uzwil (CH)

(72) Inventors: Andreas Krische, Henau (CH); Manjunatha Mutaguppe Venkatesh, Karnataka (IN)

(73) Assignee: Buhler AG, Uzwil (CH)

( * ) Notice: Subject to any disclaimer, the term of this patent is extended or adjusted under 35 U.S.C. 154(b) by 77 days.

(21) Appl. No.: 17/617,859

(22) PCT Filed: Jun. 11, 2020

(86) PCT No.: PCT/EP2020/066165
§ 371 (c)(1),
(2) Date: Dec. 9, 2021

(87) PCT Pub. No.: WO2020/249658
PCT Pub. Date: Dec. 17, 2020

(65) Prior Publication Data
US 2022/0240485 A1 Aug. 4, 2022

Related U.S. Application Data

(63) Continuation of application No. PCT/CN2019/090752, filed on Jun. 11, 2019.

(51) Int. Cl.
*A01K 5/02* (2006.01)

(52) U.S. Cl.
CPC .................. *A01K 5/0258* (2013.01)

(58) Field of Classification Search
CPC ........................ A01K 5/0258; B29C 48/022; B29C 48/2564; B29C 48/25682; B29C 48/2561; B29C 48/2715; B25B 27/00; B30B 15/00; A23N 17/005; A23K 40/25
See application file for complete search history.

(56) References Cited

U.S. PATENT DOCUMENTS

| | | | |
|---|---|---|---|
| 6,164,811 A * | 12/2000 | Planeta | B29C 48/2561 366/100 |
| 2009/0291159 A1* | 11/2009 | Williams | B29C 48/25 425/88 |
| 2019/0359804 A1* | 11/2019 | Soliman | C08L 23/06 |
| 2020/0325320 A1* | 10/2020 | Spofford | B29C 48/0012 |

FOREIGN PATENT DOCUMENTS

| | | |
|---|---|---|
| DE | 33 31 502 A1 | 3/1985 |
| DE | 199 52 642 A1 | 5/2001 |
| KR | 2018 0012393 A | 2/2018 |
| WO | 99/59797 A1 | 11/1999 |

* cited by examiner

*Primary Examiner* — Rick K Chang
(74) *Attorney, Agent, or Firm* — Colson Law Group

(57) ABSTRACT

An extruder screw-handling device for handling a screw of a food or land-or-sea-animal-feed extruder, the device being suitable for fully extracting an extruder screw from an extruder barrel, wherein the device has a horizontally arranged top section, a locking screw assembly and a guiding element. The present invention is furthermore related to a method of extracting an extruder screw from a food or land-or-sea-animal-feed extruder using the device.

16 Claims, 6 Drawing Sheets

EXTRUDER SCREW HANDLING DEVICE

Figure 1:
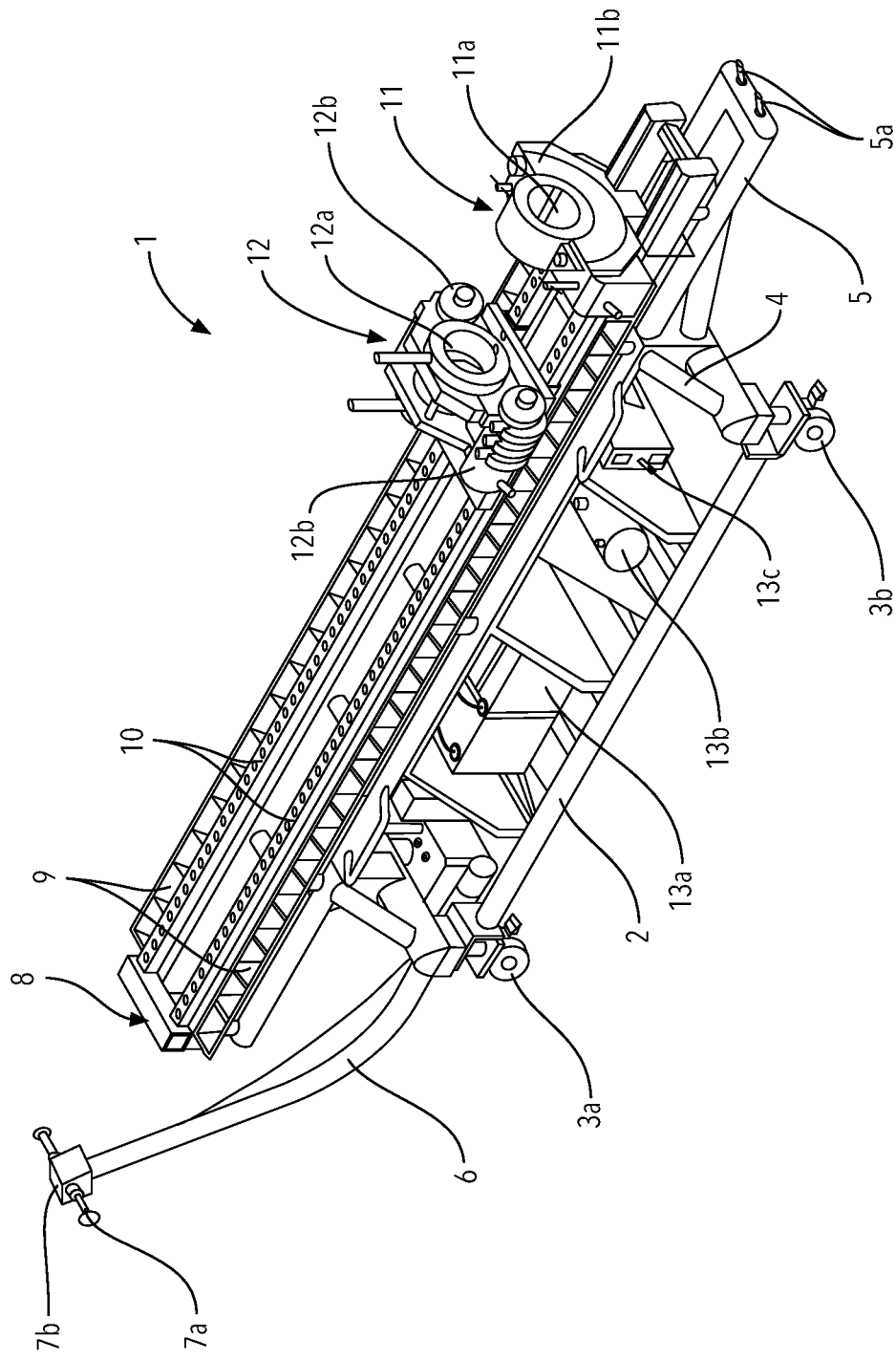

The present invention is related to a an extruder screw handling device for extracting at least one extruder screw of a food or land-or-sea-animal-feed extruder, said device being suitable for fully extracting an extruder screw from an extruder barrel, transporting the screw and enabling access to the screw to carry out maintenance and/or cleaning tasks.

Extruders are well known and are used extensively in various fields of technology. Typically, raw materials are loaded into a hopper of an extruder and led to an extruder screw rotatably mounted in barrel or housing that can be heated. The material is treated in the extruder and exits the extruder, typically through a head and die section of the extruder.

Conventional extruder screws typically include a rotatable shaft that carries a plurality of screw elements, which can include conveyor elements and/or kneader elements.

For ensuring adequate functionality of the extruder, it is necessary to clean, repair or even replace the screw after a certain period of operation.

In DE-33 31 502 A1, in order to extract a screw from the barrel of an extruder, a sleeve is fastened at a free end of the screw. Said sleeve comprises counter-elements. A yoke that is connected to hydraulic cylinders provided at the extruder, pushes against those counter-elements when the hydraulic cylinders are actuated, thus pushing the sleeve and the screw fastened thereon axially away from the extruder. Subsequently, the sleeve is released, moved along the screw in the direction of the extruder, fastened again at the screw, and the hydraulic cylinders are actuated, thus pushing the sleeve and the screw attached thereon further from the extruder. This process can be repeated until the screw is fully extracted from the extruder barrel.

Said method has certain disadvantages. The more the screw is extracted from the extruder barrel, the more there is a risk of deformation due to the weight of the screw as the screw is not supported outside the barrel. Also, in this document it is not ensured that extraction of the screw can be performed in a manner that prevents damage to the barrel liners or screw elements, since the screw shaft is not adequately guided during extraction.

Furthermore, hydraulic cylinders have to be attached to the extruder for the extraction process. Also, the step of rearranging the sleeve on the screw for the next extraction step is time-consuming, as it requires precise positioning and fastening of the sleeve on the screw. Said step has to be repeated numerous times, since in each step the screw is only extracted for about the length of one screw element.

In U.S. Pat. No. 6,164,811 A, a screw of an extruder can be extracted rearwardly through a hollow driveshaft of a gearbox of an extruder, with the aid of an extractor that can be attached to the gear box and the screw in the hollow driveshaft. By preferably manual rotation with the aid of a handle, the screw is extracted from the extruder into the extractor. For complete withdrawal of the screw, said extractor has to be sufficiently long, which gives rise to problems of stability. Also, the extracted screw in the extractor cannot be easily accessed for purposes of cleaning and/or maintenance.

There is a need in the art for an easy and efficient method for extracting a screw from an extruder barrel, transporting the screw and enabling access to the screw to carry out maintenance and/or cleaning tasks.

It was the problem of the present invention to overcome the drawbacks of the prior art and to meet the above need.

Said problem has been solved according to the present invention by a device and a method as described in the independent claims.

In detail, the present invention is related to an extruder screw handling device for extracting at least one extruder screw of a food or land-or-sea-animal-feed extruder, said device being suitable for fully extracting the extruder screw from a barrel of the extruder, in which barrel the extruder screw rotates when the extruder is operating to extrude food or animal-feed product, wherein said device comprises:
- a locking screw assembly that is configured so as to be securely and releasably attachable to an end section of the extruder screw; and
- actuating means for moving the locking screw assembly away from the extruder, whereby, when the device is in operation to extract the extruder screw, moving the extruder screw, when securely attached to the locking screw assembly, out of its extruder barrel;

characterized in that
the device further comprises:
- a horizontally-arranged top section, which is at least half as long as the extruder screw that is to be extracted;
- a plurality of wheels;
- a support structure which supports the top section and which is supported on the ground by the plurality of wheels;
- a guiding element which is mounted on and towards one end of said top section, said guiding element having an opening through which the extruder screw can be moved during extraction; and
- guide means which are mounted on the top section and which guide motion of the locking screw assembly, which is movably connected to said guide means, wherein the locking screw assembly comprises a central opening for secure and releasable attachment of the extruder screw,
wherein the actuating means are mounted on an outer surface of the locking screw assembly,
whereby the extruder screw handling device is further suitable:
- for transporting the extruder screw after extraction from the extruder; and
- for enabling access to the extruder screw to carry out maintenance and/or cleaning tasks.

The present invention provides a device for easy and efficient extraction of an extruder screw of a food or land-or-sea-animal-feed extruder. Said device can be easily brought into close proximity and preferably attached to an end of such an extruder and allows centered guiding of the extruder screw out of the extruder barrel without damaging the barrel liners or the screw elements.

This is achieved by leading the extruder screw through an opening in a guiding element that is mounted on and towards one end of the top section of the device and securely and releasably attacking the extruder screw in a central opening of a locking screw assembly that is also provided on the top section of the device. Said locking screw assembly comprises actuating means, preferably one hydraulic cylinder and especially preferred two hydraulic cylinders, which are mounted on an outer surface, preferably on the side surfaces, of the locking screw assembly. When these actuating means are actuated, they move the locking screw assembly away from a counter-element, thus extracting the extruder screw securely attached in the locking screw assembly out of the extruder barrel. At the beginning of the extraction operation, the guiding means may serve as a counter-element for the actuating means, preferably hydraulic cylinders. Alternatively, and necessarily after the first stroke of the actuating means, preferably hydraulic cylinders, stopper elements are provided in two arrays of openings that are provided in the top section of the device. These stopper elements serve as counter-elements for the actuating means, preferably hydraulic cylinders. After each stroke of the actuating means, preferably hydraulic cylinders, the stopper elements are shifted and inserted in the openings of the two arrays of openings between the locking screw assembly and the extruder that are adjacent to the locking screw assembly. The two arrays of openings preferably extend over at least 75% of the length of the top section, from one end of the top section to the guiding element provided at the other end of the top section. Thus, by repeated strokes of the actuating means, preferably hydraulic cylinders, against the stopper elements that are shifted from openings nearer to the guiding elements to openings more remote from the guiding element, the extruder screw can be extracted in a step-wise manner.

Thus, the present invention is also related to a method for extracting an extruder screw from a food or land-or-sea-animal-feed extruder, comprising the steps:
a) providing an extruder screw handling device as described above in close proximity to the extruder so that the extruder screw of the extruder extends through a guiding element of the device,
b) securely and releasably attaching an end section of the extruder screw to a locking screw assembly of the device,
c) actuating at least one actuating means mounted on the locking screw assembly, wherein said actuating means push the locking screw assembly away from either said guiding element, or from stopper element(s) positioned in a first one or pair of at least one, preferably two, array(s) of openings, thereby moving the locking screw assembly, and the end section of the extruder screw attached thereto, away from the extruder,
d) inserting the stopper element(s) in a second one or pair of the opening(s) of the array(s) of openings, wherein the second opening(s) are further away from the extruder than the first opening(s),
e) optionally repeating steps c) and d).

The top section of the device has a horizontal length that is at least half as long as the extruder screw that is to be extracted, and preferably is as long as or longer than the extruder screw that is to be extracted. According to a particularly preferred embodiment, the top section of the device has a length of 2000 to 6000 m, preferably 3000 to 5000 mm, more preferably 3500 to 4500 mm, and a width of preferably 400 to 1000 mm, more preferably 500 to 800 mm. Therewith, the extruder screw is adequately supported during and after extraction. No damage due to the weight of the extruder screw can occur. Furthermore, the fully extracted extruder screw is provided, i.e. mounted, on the top section of the device and can thus be easily transported after the device has been released from the extruder. Since the top section of the device is open, the extruder screw provided on the top section is easily accessible to carry out maintenance and/or cleaning tasks.

Thus, the present invention is also related to a method for carrying out maintenance and/or cleaning tasks on an extruder screw of a food or land-or-sea-animal-feed extruder, the method comprising the steps of extracting the extruder screw from the extruder by the method described herein, and performing the chosen task on the extracted extruder screw while mounted on the device.

The device of the present invention is suitable for extracting at least one extruder screw of a food or land-or-sea-animal-feed extruder. These extruders are known and do not have to be explained here in detail. Preferably, the extruder is a single-screw extruder.

The device according to the present invention comprises a plurality of wheels for conveniently moving the device towards and away from an extruder. Preferably the device comprises four wheels, especially one wheel at each corner of the device.

According to a preferred embodiment of the present invention, the device comprises a drive wheel control means for easy movement of the device. Said drive wheel control means is operatively connected via a wheel driving means to at least one wheel, preferably two wheels, of the device. The drive wheel control means comprises a handle and control parts such as push buttons for actuating the wheel(s), preferably by electric power. If present, the drive wheel control means is provided at the side of the device that is remote from the side which will be put into proximity or attached to an extruder.

The device comprises a support structure which supports the top section described below and which is supported on the ground by the plurality of wheels. The device may have any form that is suitable for the intended purpose. According to a preferred embodiment, the device comprises as a support structure a frame of tubes, such as metal tubes, to which the wheels are attached, and which supports a top section described below. For example, the frame may be a rectangle of tubes, to which the wheels are attached, and from which additional tubes extend upwardly for supporting a top section.

According to a preferred embodiment, the height of the device can be adjusted by height adjusting means comprised in the support structure, for example by screws which connect the wheels to the device. These screws may be moved in and out of the device and secured in a desired position in a conventionally known manner. This allows adjustment of the height of the device to the height of an extruder from which an extruder screw is to be extracted, so that extraction of the extruder screw can be carried out in a centered guided manner, as mentioned above.

According to a preferred embodiment, the device furthermore comprises motive power components selected from the group consisting of electric power supply components, hydraulic medium supply components, and combinations thereof. These components serve for the supply of electric power, for example, to the drive wheel control means, and for the supply of hydraulic medium to the hydraulic cylinders at the locking screw assembly. These components may be, for example, a battery, an electric power generator like an electric motor, or a tank for hydraulic medium from which hydraulic medium can be supplied via conduits such as hoses to the hydraulic cylinders provided at the locking screw assembly. Preferably, said motive power components are connected to at least two of the actuating means, preferably hydraulic cylinders, the locking screw assembly, the wheel driving means, the device attachment means and the height adjusting means in such a way that motive power is supplied thereto. For example, hoses for supply of hydraulic medium or cables for the supply of electric energy may be used for that purpose.

Preferably, these components may be provided below the top section of the device, for example, at the support structure such as a frame of tubes.

According to a preferred embodiment, the device furthermore comprises device attachment means for securely and releasably attaching the device to an extruder. Preferably, these means are provided at one end of the support structure, such as a frame, supporting the top section. These means for securely and releasably attaching the device to an extruder can be any conventional means suitable for releasably connecting two components with each other, and preferably are selected from the group consisting of pins which can be inserted into respective openings of the extruder, bores for receiving bolts, and a combination thereof. In the case of pins, these are typically secured on the other side of the opening in which they are inserted by means of suitable counter-elements such as washers and nuts.

According to the present invention, "securely attaching" designates an attachment that is not broken during normal operation of the device. According to the present invention, "releasably attaching" designates an attachment that is not permanent, but can be released when no longer needed.

The device comprises a top section which is supported by the remainder of the device, i.e. a support structure, for example by a frame of tubes as described above. According to a preferred embodiment, the top section is connected with the remainder of the device (support structure such as a frame portion) such that the height of the top section can be adjusted, for example by screws than can be moved in and out of the remainder of the device.

Said top section is horizontally arranged, so as to enable extraction of the screw in a centered guided manner, as mentioned above. As mentioned above, the top section of the device preferably has a horizontal length that is at least half as long as the extruder screw that is to be extracted, and preferably is as long as or longer than the extruder screw that is to be extracted. According to a particularly preferred embodiment, the top section of the device has a length of 2000 to 6000 m, preferably 3000 to 5000 mm, more preferably 3500 to 4500 mm, and a width of preferably 400 to 1000 mm, more preferably 500 to 800 mm. The top section thus preferably has a rectangular shape.

According to a particularly preferred embodiment, said top section comprises at least one, preferably two array(s) of openings over at least 75% of the length of the top section, from one end of the top section to the guiding element provided at the other end of the top section. These arrays serve for the insertion of stopper elements.

According to the present invention, "from one end" means here that the at least one, preferably two array(s) of openings begin at the respective end of the top section or in a distance of 1-10% of the entire length of the top section from the respective end of the top section.

According to a preferred embodiment, the top section of the device is provided in the form of a rectangular frame, wherein the at least one, preferably two array(s) of openings is/are provided in the longer portions of the frame. Preferably, each array consists of 10 to 30 openings, more preferably 15 to 25 openings. The openings may have any shape. According to a preferred embodiment the openings have the form of a triangular prism with the quadratic face forming the entrance of the opening. This allows the insertion of stopper elements with a wedge-shaped lower section and an upper section with a suitable form for serving as counter-elements for the hydraulic cylinders in the openings, thus forming stable counter-elements for the actuating means, preferably hydraulic cylinders.

A guiding element is provided (i.e. mounted) at and towards one end of said top section of the device, i.e. at the end remote from the end where the array of openings begin(s) and the drive wheel control means, if any, is provided. In other words, the guiding element is provided at and towards the end of said top section which is to be brought into proximity or attached to an extruder for extraction of an extruder screw, between said end and a locking screw assembly described below.

According to the present invention, "at one end" means here that the guiding element is provided at the respective end of the top section or in a distance of 1-30%, preferably 5-20%, of the entire length of the top section from the respective end of the top section. "Towards the one end" means here that the guiding element is positioned in the direction of the end such that it can be brought into connection with an extruder screw of an extruder.

Preferably, the guiding element is fixedly connected to the top section, i.e. it cannot be moved on the top section.

Said guiding element has an opening through which an extruder screw to be extracted can be moved during extraction. Preferably, the guiding element comprises an upper part and a lower part which can be connected with each other, for example by screws. For insertion of an extruder screw of an extruder, the upper part can be removed, the extruder screw of the extruder can be inserted into the opening, and then the upper part can be reattached to the lower part of the guiding means.

According to a preferred embodiment, the guiding element comprises portions which can serve as counter-elements for the actuating means, preferably hydraulic cylinders, of the locking screw assembly. This may be, for example, rectangular sheets, e.g. metal sheets on each side of the opening of the guiding element.

Preferably, the guiding element also comprises device attachment means for securely and releasably attaching the guiding element to an extruder. These device attachment means for securely and releasably attaching the guiding element to an extruder can be any conventional means suitable for releasably connecting two components with each other, and preferably are selected from the group consisting of pins which can be inserted into respective openings of the extruder, bores for receiving bolts, and a combination thereof. In the case of pins, these are typically secured on the other side of the opening in which they are inserted by means of suitable counter-elements such as washers and nuts.

Thus, according to a particularly preferred embodiment of the present invention, the guiding element is provided at and towards one end of the top section of the device and comprises device attachment means for securely and releasably attaching the guiding element to an extruder. This ensures a highly reliable guidance of a screw which is extracted from a single-screw extruder through said guiding element in a centered guiding manner, thus preventing any damage to the screw element or the barrel liners of the extruder.

On the side of the guiding element remote from the end of the top section where the guiding element is provided, there is provided a locking screw assembly. Said locking screw assembly is movably provided on the top section of the device, i.e. it can be moved from and to the guiding element.

According to the present invention, guide means, preferably guide rails, for guiding motion of the locking screw assembly are provided (i.e. mounted) on the top section of the device. The locking screw assembly is movably connected to said guide means, preferably guide rails. According to a preferred embodiment, the locking screw assembly comprises components such as gliding shoes which can securely move on rails, allowing a smooth and precise movement of the locking screw assembly. According to a particularly preferred embodiment, the guide means, preferably guide rails, are provided in the inner part of the top section that is limited at its sides by the two arrays of openings.

The locking screw assembly comprises a central opening in which an extruder screw of an extruder can be securely and releasably attached. Said opening can have a two-part form as the opening of the preferred embodiment of the guiding element. Alternatively and preferably, the locking screw assembly is configured to be securely and releasably attachable to the end section of the extruder screw by secure and releasable attachment to screw flights of the extruder screw. Preferably, a rotable lock can be provided at the outlet of the opening remote from the guiding element, and the extruder screw to be extracted is fastened by rotating the lock.

The device of the present invention comprises actuating means for moving the locking screw assembly away from the extruder, whereby, when the device is in operation to extract the extruder screw, moving the extruder screw, when securely attached to the locking screw assembly, out of its extruder barrel. These actuating means are mounted on an outer surface of the locking screw assembly, preferably on the side surfaces of the locking screw assembly. While any actuating means known for purposes of moving a component along guide means such as guide rails could be employed, according to the present invention it is particularly preferred that the guide means comprise at least one hydraulic cylinder, preferably two hydraulic cylinders.

Thus, according to a particularly preferred embodiment, on the side surfaces of the locking screw assembly, two hydraulic cylinders are provided. Any conventional hydraulic cylinder with the adequate size can be used. These hydraulic cylinders can be connected to a hydraulic medium supply component such as a tank, via conventional conduits such as hoses.

When being supplied with hydraulic medium, the hydraulic cylinders are actuated. Preferably, this activation is made manually by a user. According to said preferred embodiment of the present invention, counter-elements are provided against which the actuated hydraulic cylinders push. Those counter-elements may be, for a first stroke, portions of the guiding element, as described above. For subsequent strokes, and preferably for all strokes, stopper elements serve as counter-elements.

According to said preferred embodiment, these stopper elements are inserted into each array of openings, so that each hydraulic cylinder provided on the sides of the locking screw assembly pushes against one stopper element. The stopper elements have a form suitable for insertion into the openings of the arrays. According to a preferred embodiment the openings have the form of a triangular prism with the quadratic face forming the entrance of the opening. In this case, stopper elements with a wedge-shaped lower section and an upper section with a suitable form for serving as counter-elements for the hydraulic cylinders are provided, for fitting insertion into these openings, thus forming stable counter-elements for the hydraulic cylinders.

The stopper elements have the necessary stability for withstanding the strokes of the hydraulic cylinders. For example, they are made of iron or steel.

The above embodiment could principally also be realized with one array of openings and one hydraulic cylinder attached to the locking screw assembly. However, more stable extraction is realized when two array of openings and two hydraulic cylinders attached to the locking screw assembly, as described in the above preferred embodiment, are employed.

According to the particularly preferred embodiment of the present invention, after an extruder screw of an extruder has been inserted through the guiding element into the opening of the locking screw assembly and fastened therein, the hydraulic cylinders are actuated, so that they push away from the counter-elements, which are either provided at the guiding element or is/are stopper element(s) provided in a first one or pair of opening(s) of the at least one, preferably two array(s). With each such stroke, the locking screw assembly is moved to the other side of the top section by a distance of preferably 100-400 mm, more preferably 200-300 mm. After each stroke, the hydraulic cylinders are retracted, and the stopper elements are shifted along the array of openings by inserting them in a second one or pair of opening(s) that are further away from the extruder, preferably into the openings adjacent to the locking screw assembly. Then, the hydraulic cylinders are actuated again, and the next stroke is carried out.

This process is repeated as long as desired, preferably until the entire extruder screw has been extracted out of the extruder barrel. Then, the extracted screw is provided (i.e. mounted) on the top section of the device. The device can be disconnected and/or removed from the extruder, so that the extracted extruder screw can be transported, if desired. This can be done very easily, since the device of the present invention is designed for easy movements, especially if a drive wheel control means is provided.

Since the extracted extruder screw on the top section of the device is readily accessible, maintenance and/or cleaning tasks can be carried out directly and efficiently while the extracted screw is mounted on the top section of the device.

The present invention provides a more easy and efficient method for carrying out cleaning and maintenance tasks. In particular, it is not necessary to remove all barrels of a single-screw extruder, e.g. with the aid of a hoist, to get access to the extruder screw. Only the last barrel has to be removed, so that the device of the present invention can be attached to the extruder and its screw. Downtime of the extruder for cleaning and maintenance is significantly reduced.

With the device of the present invention, it is also possible to (re)insert at least one extruder screw of a food or land-or-sea-animal-feed extruder into said extruder. This can be done by carrying out the method described above for extracting an extruder screw from a food or land-or-sea-animal-feed extruder in a reverse manner. Preferably, for (re)insertion of an extruder screw a double acting (or 'two-way') hydraulic cylinder may be used as actuating means.

Thus, the present invention is also related to a method for inserting an extruder screw into a food or land-or-sea-animal-feed extruder, comprising the steps:
 a) providing an extruder screw handling device as described above in close proximity to the extruder, wherein the extruder screw of the extruder extends through a guiding element of the device,
 b) securely and releasably attaching an end section of the extruder screw to a locking screw assembly of the device,
 c) actuating at least one actuating means mounted on the locking screw assembly, wherein said actuating means push the locking screw assembly away from stopper element(s) positioned in a first one or pair of at least one, preferably two, array(s) of openings, thereby moving the locking screw assembly, and the end section of the extruder screw attached thereto, in the direction to the extruder, d) inserting the stopper element(s) in a second one or pair of the opening(s) of the array(s) of openings, wherein the second opening(s) are closer to the extruder than the first opening(s), optionally repeating steps c) and d).

The present invention will now be explained in more detail with reference to non-limiting embodiments and drawings.

FIG. 1 shows one embodiment of the screw-handling device of the present invention FIGS. 2-6 shows different stages of an embodiment of the present invention of extracting an extruder screw out of a single-screw extruder In FIG. 1 there is shown one embodiment of the screw-handling device 1 of the present invention. The device 1 comprises, as a support structure, frame parts 2, 4, 5 which in this embodiment are made of metal tubes that are connected with each other. At one end of frame part 5 there are provided pins 5a for attaching the device 1 to an extruder, preferably a single-screw extruder (not shown here). A pair of front wheels 3a and a pair of back wheels 3b are provided on the frame part 2 by means of a screw connection that allows adjustment of the height of the device 1.

A drive wheel control means 6 is operatively connected via a wheel drive means to the pair of front wheels 3a, thus allowing easy movement of the device 1. At the end of the drive wheel control means 6, a handle 7a and a control panel 7b are provided. With the aid of the control panel 7b, movement of the device 1 can be controlled, i.e. in this embodiment the pair of front wheels is driven with electric power when the respective button on the control panel 7b is pushed.

On the frame part 5, a top section 8 of the device 1 is provided. Said top section 8 comprises two arrays of openings 9 and two guide rails 10.

At one end of the top section 8, a guiding element 11 is fixedly provided. Said guiding element 11 comprises an opening 11a formed from an upper section and a lower section of the guiding element 11. The upper section can be removed for insertion of an extruder screw of an extruder, preferably single-screw extruder, into the opening 11a of the guiding element 11. Furthermore, bores 11b are provided in the guiding element 11 for attaching the guiding element 11 to an extruder, preferably single-screw extruder (not shown here), by means of bolts (not shown here) which are led through the bores 11b and releasably fixed at the extruder.

On the top section 8, furthermore a locking screw assembly 12 is movably provided. Said locking screw assembly 12 may glide on the guide rails 10. Said locking screw assembly 12 comprises an opening 12a in which an extruder screw of an extruder, preferably single-screw extruder, can be securely and releasably attached (by means of a locking ring not shown here). On each side of the locking screw assembly 12 there is provided a hydraulic cylinder 12b.

The device 1 furthermore comprises a battery 13a for electric power supply (e.g. for the drive wheel control means 6), a hydraulic aggregate 13b for the supply of hydraulic medium to the hydraulic cylinder 12b via hoses (not shown here), and a control unit 13c for the operation of the hydraulic cylinders 12b.

FIGS. 2 to 6 show an embodiment of the method according to the present invention of extracting an extruder screw from an extruder, preferably single-screw extruder.

Figure 2:
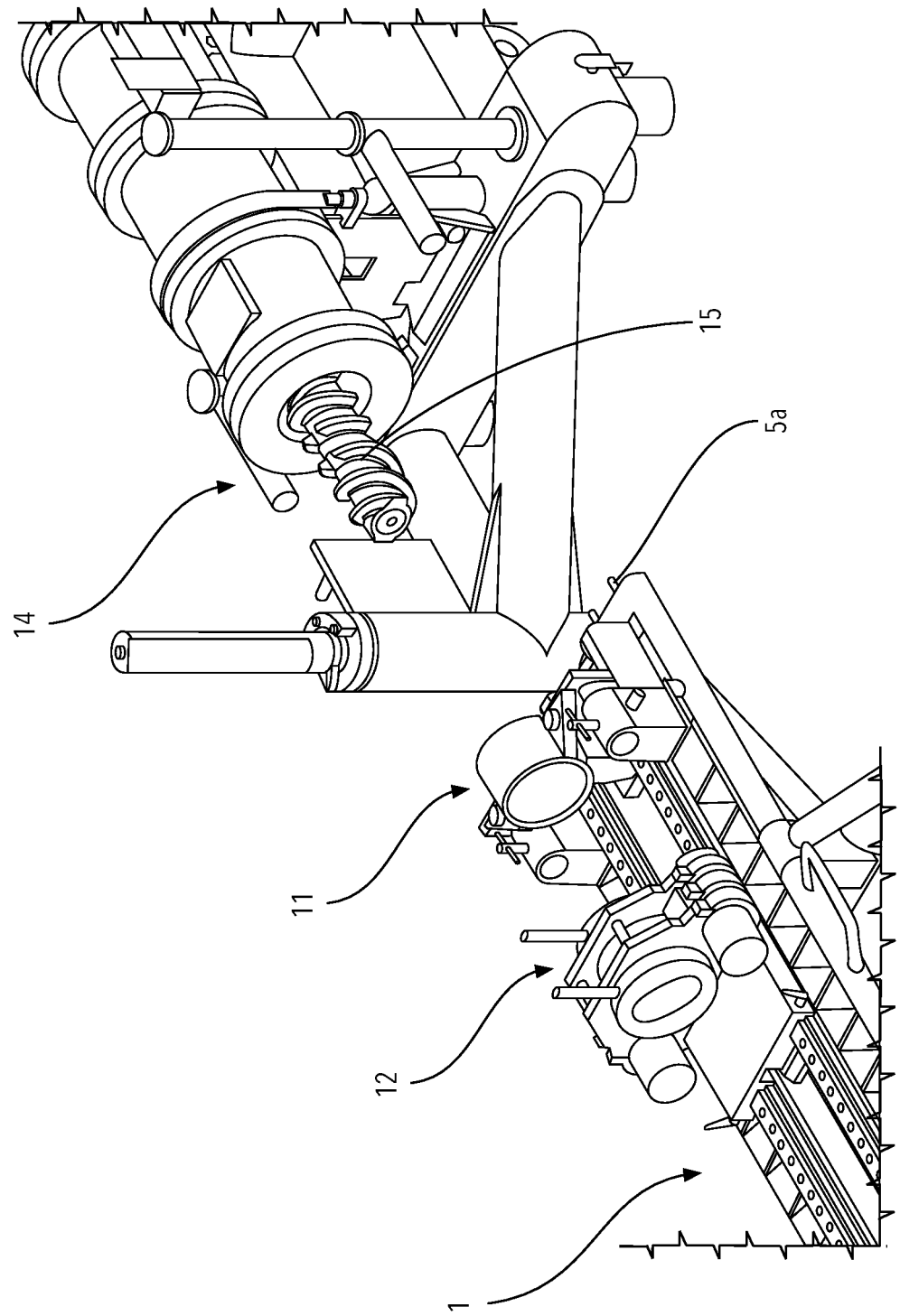

In FIG. 2, the screw-handling device 1 according to the present invention is moved to a single-screw extruder 14 with an extruder screw 15. The device 1 is attached to the extruder 14 with the aid of pins 5a as well as bolts (not shown here) that are inserted into bores (not shown here) of the guiding element 11.

Figure 3:
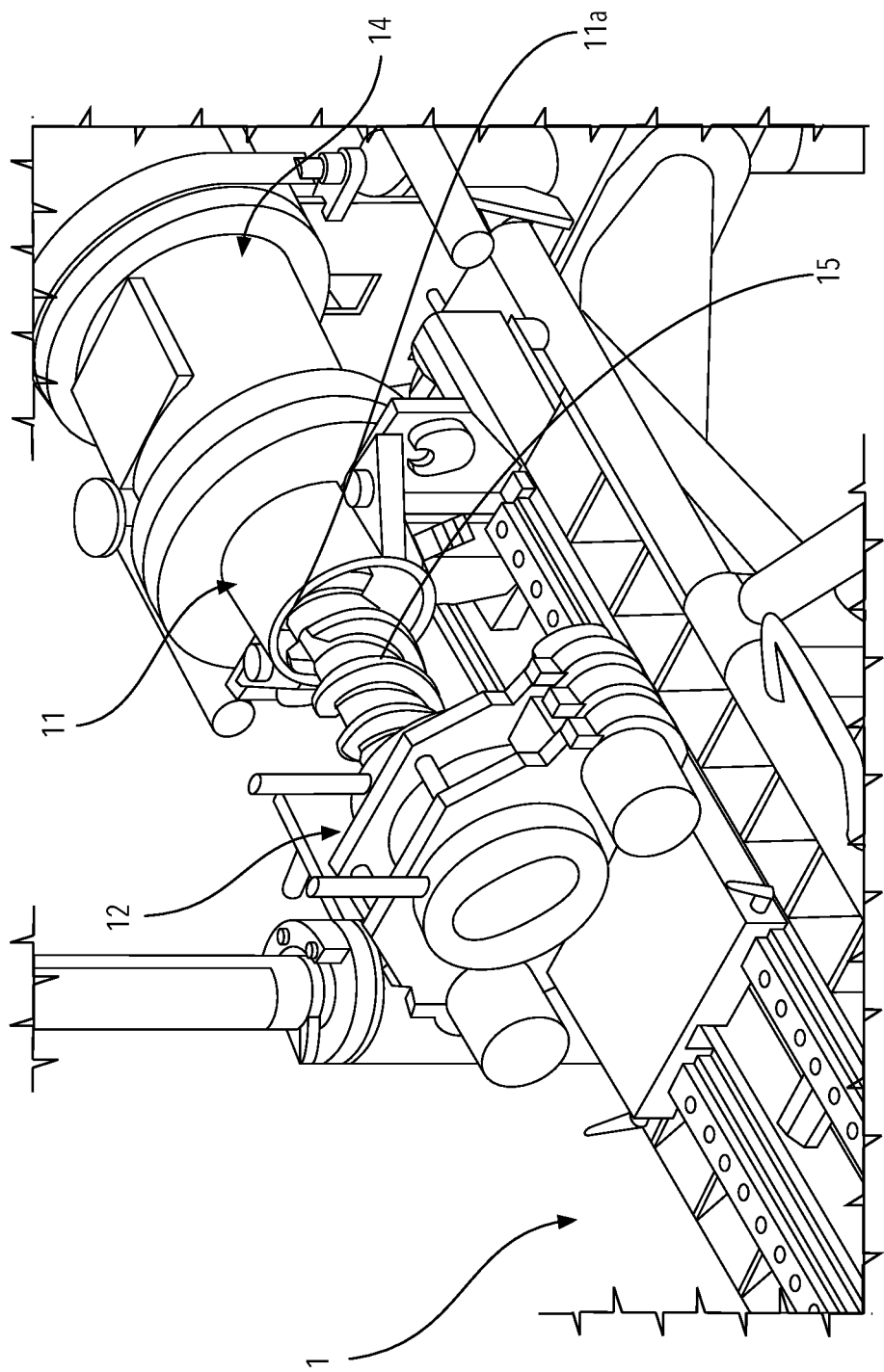

In FIG. 3, the screw-handling device 1 according to the present invention is attached to the extruder 14. The extruder screw 15 of the extruder 15 has been led through the opening 11a of the guiding element 11.

Figure 4:
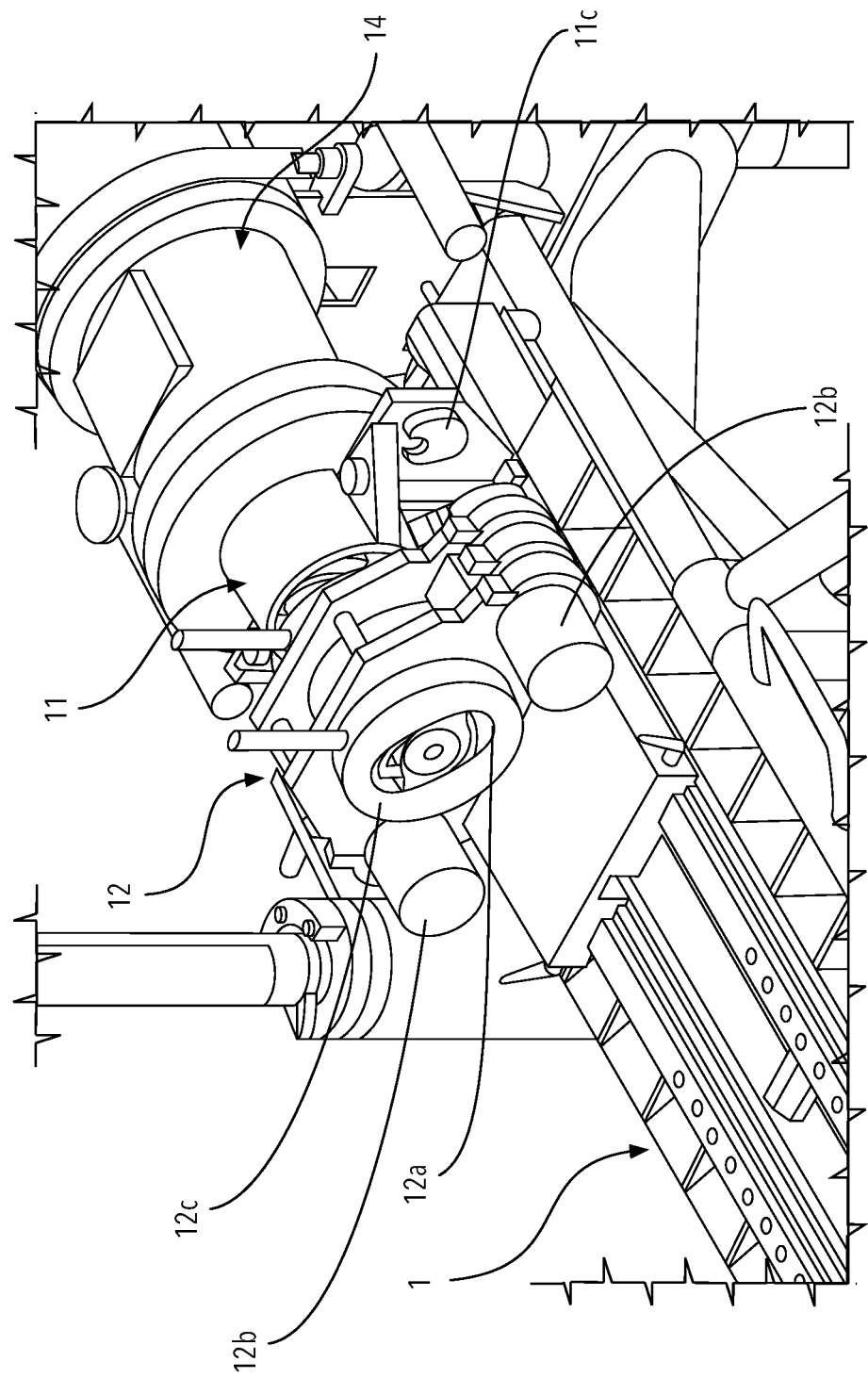

In FIG. 4, the screw locking assembly 12 has been moved onto the extruder screw 15, so that the extruder screw 15 is within the opening 12a of the screw locking assembly 12. By rotating the locking ring 12c, the extruder screw 15 is fastened within the opening 12a of the screw locking assembly 12. The device is ready for a first stroke of the hydraulic cylinders for pulling the extruder screw 15 out of the extruder 14. The first stroke is carried out by actuating the hydraulic cylinders 12b, which push themselves away from counter-elements 11c that are provided on the sides of the guiding element 11. In this embodiment, the counter-elements 11c have the form of metal sheets.

Figure 5:
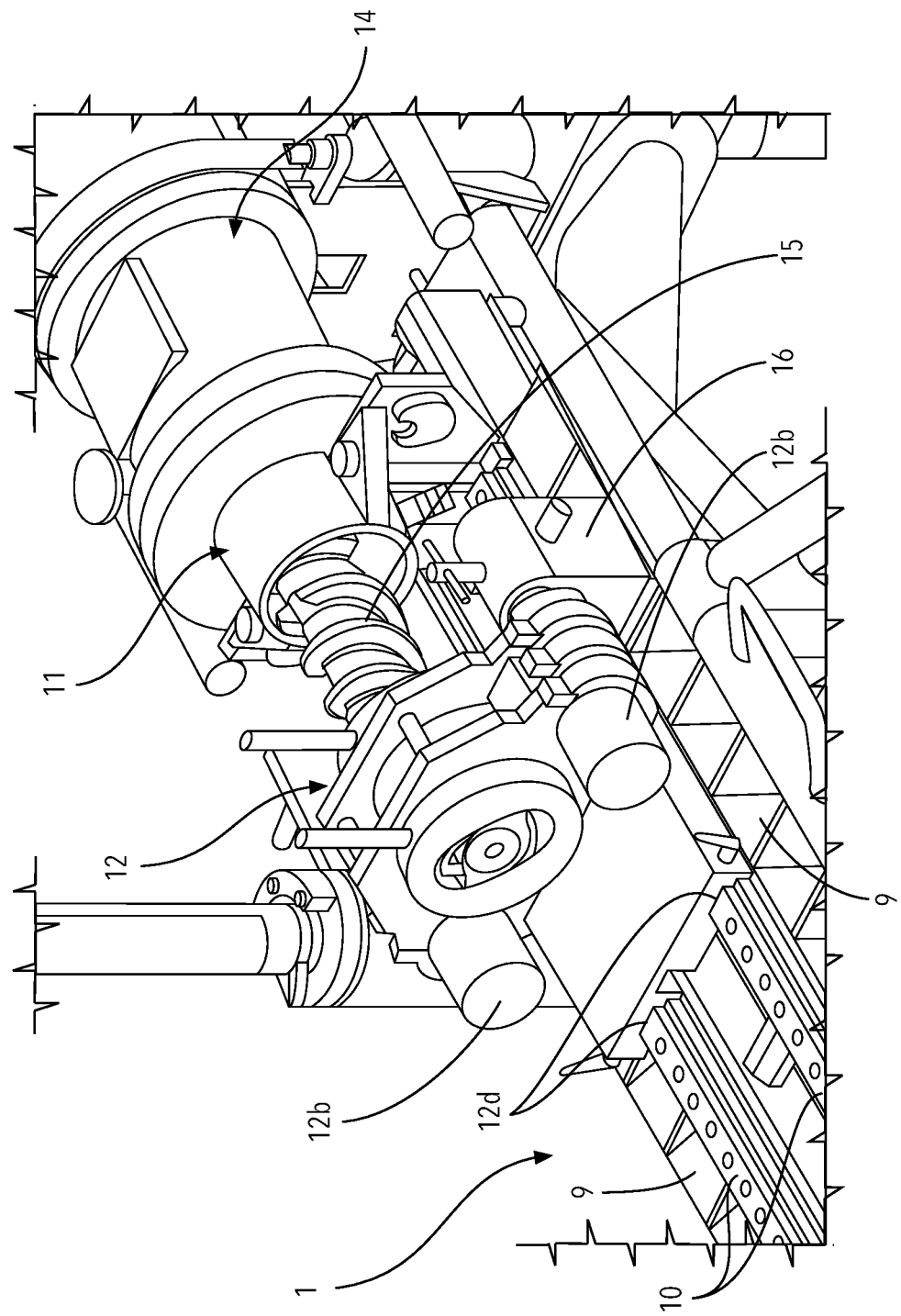

In FIG. 5, the first stroke of the hydraulic cylinders 12b has been carried out. The screw locking assembly 12 and the extruder screw 15 fastened therein has moved away from the extruder 14 by a distance of about 150-300 mm. The screw locking assembly 12 moves by means of gliding shoes 12d on guide rails 10. For carrying out the next stroke, stopper elements 16 are now provided in openings of the arrays 9 that are adjacent to the screw locking assembly 12. Typically, the openings most adjacent to the screw locking assembly 12 that can be accessed by the stopper elements 16 are used in this step. The hydraulic cylinders 12b are actuated, and push themselves away from the stopper elements 16, so that the screw locking assembly 12 and the extruder screw 15 fastened therein moves away from the extruder 14 at each stroke by a distance of about 150-300 mm.

Figure 6:
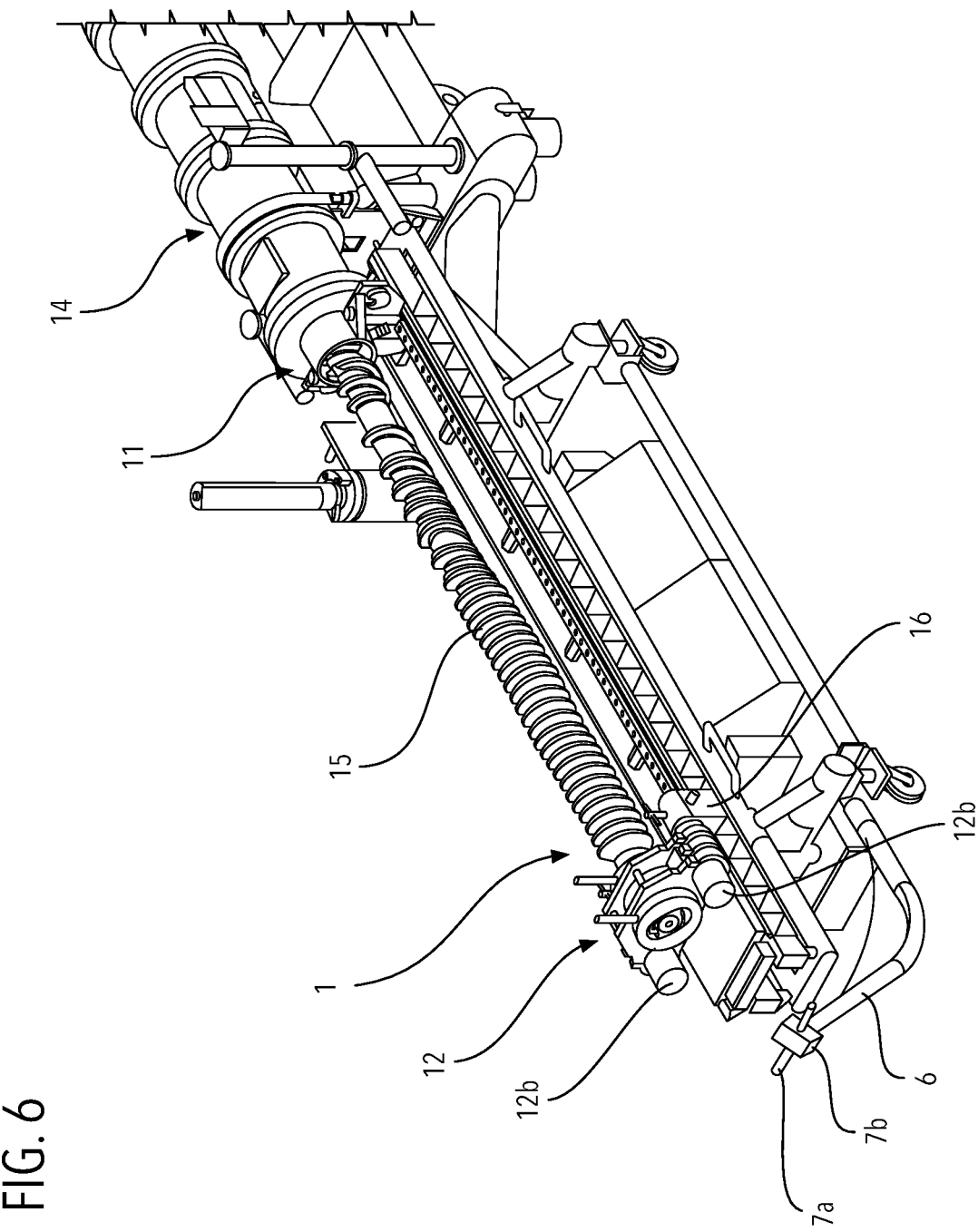

In FIG. 6, it can be seen that after repeated strokes of the hydraulic cylinders 12b, the screw locking assembly 12 has arrived at the end of the screw-handling device 1, thereby fully extracting the extruder screw 15 fastened in the screw locking assembly 12 from the extruder 14. The screw-handling device 1 can now be removed from the extruder 14 and moved around using the drive wheel control means 6 with its attached handle 7a and control panel 7b.

The invention claimed is:

1. An extruder screw handling device for extracting and/or inserting at least one extruder screw of a food or land-or-sea-animal-feed extruder, said device being suitable for fully extracting the extruder screw from a barrel of the extruder and/or for fully inserting the extruder screw into a barrel of the extruder, in which the barrel of the extruder screw rotates when the extruder is operating to extrude food or animal-feed product, wherein said device comprises:
   a locking screw assembly that is configured so as to be securely and releasably attachable to an end section of the extruder screw; and,
   actuating means for moving the locking screw assembly away from the extruder, whereby, when the device is in operation to extract the extruder screw, moving the extruder screw, when securely attached to the locking screw assembly, out of its extruder barrel;
   wherein the device further comprises:
   a horizontally-arranged top section, which is at least half as long as the extruder screw that is to be extracted;
   a plurality of wheels;
   a support structure which supports the top section and which is supported on a ground by the plurality of wheels;

a guiding element which is mounted on and towards one end of said top section, said guiding element having an opening through which the extruder screw can be moved during extraction; and a guide means which are mounted on the top section and which guide motion of the locking screw assembly, which is movably connected to said guide means, wherein the locking screw assembly comprises a central opening for secure and releasable attachment of the extruder screw, wherein the actuating means are mounted on an outer surface of the locking screw assembly, whereby the extruder screw handling device is further suitable:

for transporting the extruder screw after extraction from the extruder; and for enabling access to the extruder screw to carry out maintenance and/or cleaning tasks.

2. The device according to claim 1, wherein the top section is as long as or longer than the extruder screw that is to be extracted.

3. The device according to claim 1, wherein said top section comprises at least one array of openings over at least 75% of a length of the top section.

4. The device according to claim 3, wherein stopper element(s) is/are provided which can be inserted into the array of openings.

5. The device according to claim 1, wherein the device further comprises a device attachment means for securely and releasably attaching the device to the extruder and/or the guiding element comprises guiding element attachment means for releasably attaching the guiding element to the extruder.

6. The device according to claim 1, wherein said guide means comprise guide rails.

7. The device according to claim 1, wherein said actuating means comprise at least one hydraulic cylinder, preferably two hydraulic cylinders, and especially preferred double-acting hydraulic cylinder(s).

8. The device according to claim 1, wherein the device further comprises a wheel driving means for driving at least one of the wheels and a drive wheel control means.

9. The device according to claim 8, wherein said motive power components are connected to at least two of the actuating means, the locking screw assembly, the wheel driving means, the device attachment means, and the height adjusting means in such a way that motive power is supplied thereto.

10. The device according to claim 1, wherein said device further comprises motive power components selected from the group consisting of electric power supply components, hydraulic medium supply components, and combinations thereof.

11. The device according to claim 1, wherein the support structure comprises height adjusting means for adjusting the height of the device.

12. The device according to claim 1, wherein said top section comprises at least two arrays of openings over at least 75% of the length of the top section.

13. A method for extracting an extruder screw from a food or land-or-sea-animal-feed extruder, comprising the steps:
a) providing an extruder screw handling device according to claim 1 in close proximity to the extruder so that the extruder screw of the extruder extends through a guiding element of the device,
b) securely and releasably attaching an end section of the extruder screw to a locking screw assembly of the device,
c) actuating at least one actuating means mounted on the locking screw assembly, wherein said actuating means push the locking screw assembly away from either said guiding element, or from stopper element(s) positioned in a first one or pair of at least one, preferably two, array(s) of openings, thereby moving the locking screw assembly, and the end section of the extruder screw attached thereto, away from the extruder,
d) inserting the stopper element(s) in a second one or pair of the opening(s) of the array(s) of openings, wherein the second opening(s) are further away from the extruder than the first opening(s),
e) optionally repeating steps c) and d).

14. The method according to claim 13, wherein steps c) and d) are repeated until the extruder screw is fully extracted from the extruder.

15. The method according to claim 14, wherein prior to step b) the device is releasably and securely attached to the extruder and after the extruder screw is fully extracted from the extruder, the device is disconnected from the extruder, so that the extruder screw can be transported on the device.

16. A method for carrying out maintenance and/or cleaning tasks on an extruder screw of a food or land-or-sea-animal-feed extruder, the method comprising the steps of extracting the extruder screw from the extruder by the method according claim 13, and performing the chosen task on the extracted extruder screw while mounted on the device.

* * * * *